United States Patent
Li et al.

(10) Patent No.: US 6,272,615 B1
(45) Date of Patent: Aug. 7, 2001

(54) DATA PROCESSING DEVICE WITH AN INDEXED IMMEDIATE ADDRESSING MODE

(75) Inventors: Stephen (Hsiao Yi) Li, Garland; Jonathan Rowlands, Dallas; Fuk Ho Pius Ng; Maria B. H. Gill, both of Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/851,573

(22) Filed: May 2, 1997

(51) Int. Cl.[7] ................................... G06F 12/00
(52) U.S. Cl. .................... 711/220; 711/200; 711/202; 711/215
(58) Field of Search .................... 711/200, 220, 711/215, 202; 370/149; 381/29–51

(56) References Cited

U.S. PATENT DOCUMENTS

| | | | |
|---|---|---|---|
| 3,614,741 | * 10/1971 | McFarland | 340/172.5 |
| 4,388,685 | * 6/1983 | Kotok et al. | 364/200 |
| 5,357,620 | * 10/1994 | Suzuki | 395/400 |
| 5,509,129 | * 4/1996 | Guttag et al. | 395/375 |
| 5,809,245 | * 9/1998 | Zenda | 395/200.47 |

OTHER PUBLICATIONS

MPEG–1, 3–11172.

MPEG–2, Information Technology—Generic Coding of Moving Pictures and Audio: Audio *ISO/IEC 13818–3*, $2^{nd}$ Edition, Feb. 20, 1997 (ISO/IEC JTC1/SC29/WG11 N1519), Int'l Org. for Standardisation Coding of Moving Pictures and Audio.

*Digital Audio Compression Standard (AC–3)*, Dec. 20, 1995, Advanced Television Systems Committee, ATSC Standard.

TI–17424A (S.N. 08/475,251), allowed, Integrated Audio Decoder System and Method of Operation.

TI–17600 (S.N. 08/054,127), allowed, System Decoder Circuit With Temporary Bit Storage and Method of Operation.

TI–24442P (S.N. 60/030,106), filed Provisionally Nov. 1, 1996. Integrated Audio/Video Decoder Circuitry.

* cited by examiner

*Primary Examiner*—Tuan V. Thai
(74) *Attorney, Agent, or Firm*—Gerald E. Laws; W. James Brady, III; Frederick J. Telecky, Jr.

(57) ABSTRACT

A data processing device is provided with an indexed-immediate addressing mode for processing streams of data. An instruction register 900 receives an instruction for execution. Decoding circuitry 913 selects a register specified by a field in an instruction to provide an index value. An immediate field from the instruction is combined with the index value by multiplexor 910 to form an address which can be used to access a data value or to form a target address for a branch instruction. Mux control 915 parses the immediate value to determine how to combine the immediate value and the index value.

12 Claims, 8 Drawing Sheets

DATA PROCESSING DEVICE WITH AN INDEXED IMMEDIATE ADDRESSING MODE

FIELD OF THE INVENTION

This invention relates in general to the field of electronic systems and more particularly to an improved modular audio data processing architecture and method of operation.

BACKGROUND OF THE INVENTION

Audio and video data compression for digital transmission of information will soon be used in large scale transmission systems for television and radio broadcasts as well as for encoding and playback of audio and video from such media as digital compact cassette and minidisc.

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG standard has gained wide acceptance in satellite broadcasting, CD-ROM publishing, and DAB. The MPEG Standard is useful in a variety of products including digital compact cassette decoders and encoders, and minidisc decoders and encoders, for example. In addition, other audio standards, such as the Dolby AC-3 standard, involve the encoding and decoding of audio and video data transmitted in digital format.

The AC-3 standard has been adopted for use on laser disc, digital video disk (DVD), the US ATV system, and some emerging digital cable systems. The two standards potentially have a large overlap of application areas.

Both of the standards are capable of carrying up to five full channels plus one bass channel, referred to as "5.1 channels," of audio data and incorporate a number of variants including sampling frequencies, bit rates, speaker configurations, and a variety of control features. However, the standards differ in their bit allocation algorithms, transform length, control feature sets, and syntax formats.

Both of the compression standards are based on psychoacoustics of the human perception system. The input digital audio signals are split into frequency subbands using an analysis filter bank. The subband filter outputs are then downsampled and quantized using dynamic bit allocation in such a way that the quantization noise is masked by the sound and remains imperceptible. These quantized and coded samples are then packed into audio frames that conform to the respective standard's formatting requirements. For a 5.1 channel system, high quality audio can be obtained for compression ratio in the range of 10:1.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications.

An object of the present invention is provide an improved apparatus and methods of processing MPEG, AC-3 or other streams of data.

Other objects and advantages will be apparent to those of ordinary skill in the art having reference to the following figures and specification.

SUMMARY OF THE INVENTION

In general, and in a form of the present invention a data processing device for processing a stream of data is provided which has a central processing unit (CPU) with an instruction register for holding an instruction. The CPU is operable to process a data word in response to the instruction. An index register connected to the CPU is operable to provide a base address in response to the instruction. Address circuitry is connected to the CPU and is operable to form an address of the data word by combining a portion of the base address with a portion of an immediate field in the instruction.

In another form of the invention, decoder circuitry is connected to the address circuitry and selects a certain width for the base portion of the address in response to a field in the instruction.

In another form of the instruction, a method is provided for accessing multiple data structures in a data processing system using a common index value. The method first initializes an index register within the data processing system with the common index value. A first instruction is executed which has an indexed immediate addressing mode, wherein the first instruction has an immediate value comprising a first base value, such that a first data structure in a first portion of memory of the data processing system is accessed by the first instruction. A second instruction is executed which also has an indexed immediate addressing mode, wherein the second instruction has an immediate value comprising a second base value, such that a second data structure in a second portion of memory of the data processing system is accessed by the second instruction using the same index value as the first instruction.

In another form of the invention, a method is provided for performing multi-way branching in a data processing system. An index register is first initialized with a data value that is indicative of a target address in a group of instructions. A branch instruction having an indexed immediate addressing mode is executed that has an immediate field with a base value that points to the group of instructions. A specific target instruction is branched to by combining the base value and the target address.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF THE INVENTION

Aspects of the present invention include methods and apparatus for processing and decompressing an audio data stream. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

The present invention comprises a system that is operable to efficiently decode a stream of data that has been encoded and compressed using any of a number of encoding standards, such as those defined by the Moving Pictures Expert Group (MPEG-1 or MPEG-2), or the Digital Audio Compression Standard (AC-3), for example. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG or AC-3 data streams can also contain ancillary data which may be used as system control information or to transmit associated data such as song titles or the like. The system of the present invention must recognize ancillary data and alert other systems to its presence.

Figure 1:
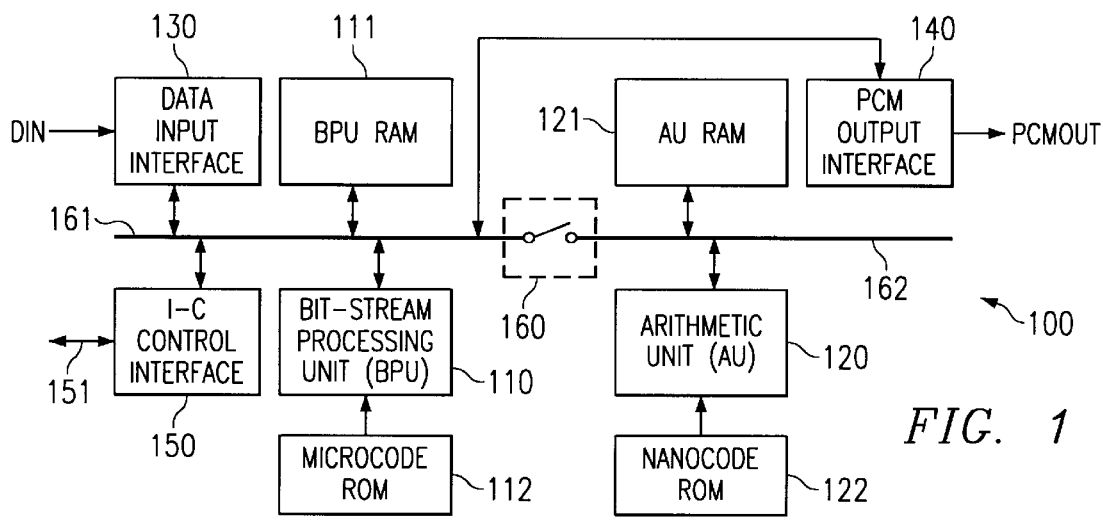
FIG. 1 is a block diagram of a data processing device constructed in accordance with aspects of the present invention.

In order to appreciate the significance of aspects of the present invention, the architecture and general operation of a data processing device which meets the requirements of the preceding paragraph will now be described. Referring to FIG. 1, which is a block diagram of a data processing device 100 constructed in accordance with aspects of the present invention, the architecture of data processing device 100 is illustrated. The architectural hardware and software implementation reflect the two very different kinds of tasks to be performed by device 100: decoding and synthesis. In order to decode a steam of data, device 100 must unpack variable length encoded pieces of information from the stream of data. Additional decoding produces set of frequency coefficients. The second task is a synthesis filter bank that converts the frequency domain coefficients to PCM data. In addition, device 100 also needs to support dynamic range compression, downmixing, error detection and concealment, time synchronization, and other system resource allocation and management functions.

The design of device 100 includes two autonomous processing units working together through shared memory supported by multiple I/O modules. The operation of each unit is data-driven. The synchronization is carried out by the Bit-stream Processing Unit (BPU) which acts as the master processor. Bit-stream Processing Unit (BPU) 110 has a RAM 111 for holding data and a ROM 112 for holding instructions which are processed by BPU 110. Likewise, Arithmetic Unit (AU) 120 has a RAM 121 for holding data and a ROM 122 for holding instructions which are processed by AU 120. Data input interface 130 receives a stream of data on input lines DIN which is to be processed by device 100. PCM output interface 140 outputs a stream of PCM data on output lines PCMOUT which has been produced by device 100. Inter-Integrated Circuit ($I^2C$) Interface 150 provides a mechanism for passing control directives or data parameters on interface lines 151 between device 100 and other control or processing units, which are not shown, using a well known protocol. Bus switch 160 selectively connects address/data bus 161 to address/data bus 162 to allow BPU 110 to pass data to AU 120.

Figure 2:
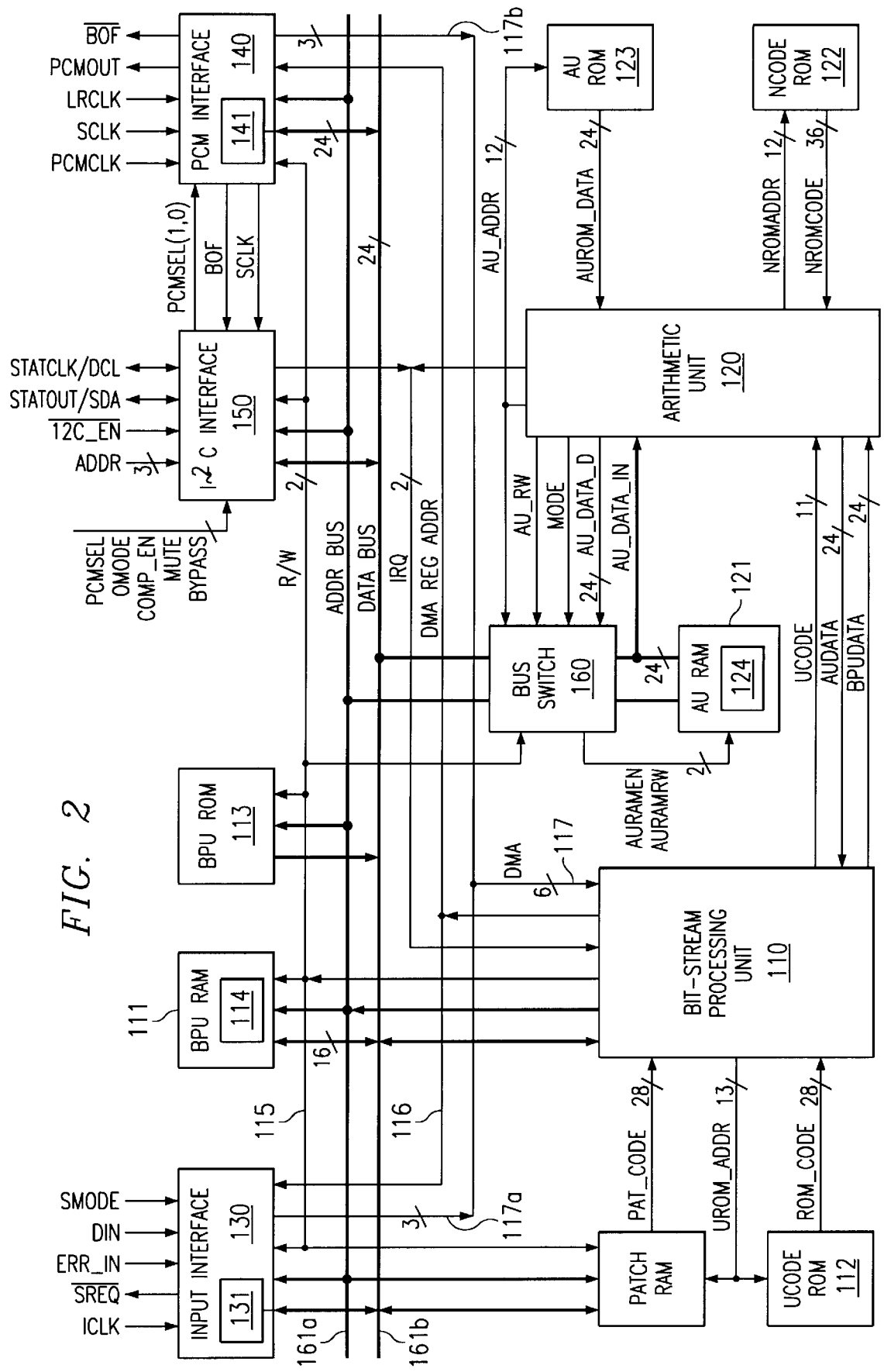
FIG. 2 is a more detailed block diagram of the data processing device of FIG. 1, illustrating interconnections of a Bit-stream Processing Unit and an Arithmetic Unit.

FIG. 2 is a more detailed block diagram of the data processing device of FIG. 1, illustrating interconnections of Bit-stream Processing Unit 110 and Arithmetic Unit 120. A BPU ROM 113 for holding data and coefficients and an AU ROM 123 for holding data and coefficients is also shown.

A typical operation cycle is as follows: Coded data arrives at the Data Input Interface 130 asynchronous to device 100's system clock, which operates at 27 MHz. Data Input Interface 130 synchronizes the incoming data to the 27 MHz device clock and transfers the data to a buffer area 114 in BPU memory 111 through a direct memory access (DMA) operation. BPU 110 reads the compressed data from buffer 114, performs various decoding operations, and writes the unpacked frequency domain coefficients to AU RAM 121, a shared memory between BPU and AU. Arithmetic Unit 120 is then activated and performs subband synthesis filtering, which produces a stream of reconstructed PCM samples which are stored in output buffer area 124 of AU RAM 121. PCM Output Interface 140 receives PCM samples from output buffer 124 through a DMA transfer and then formats and outputs them to an external D/A converter. Additional functions performed by the BPU include control and status I/O, as well as overall system resource management.

Figure 3:
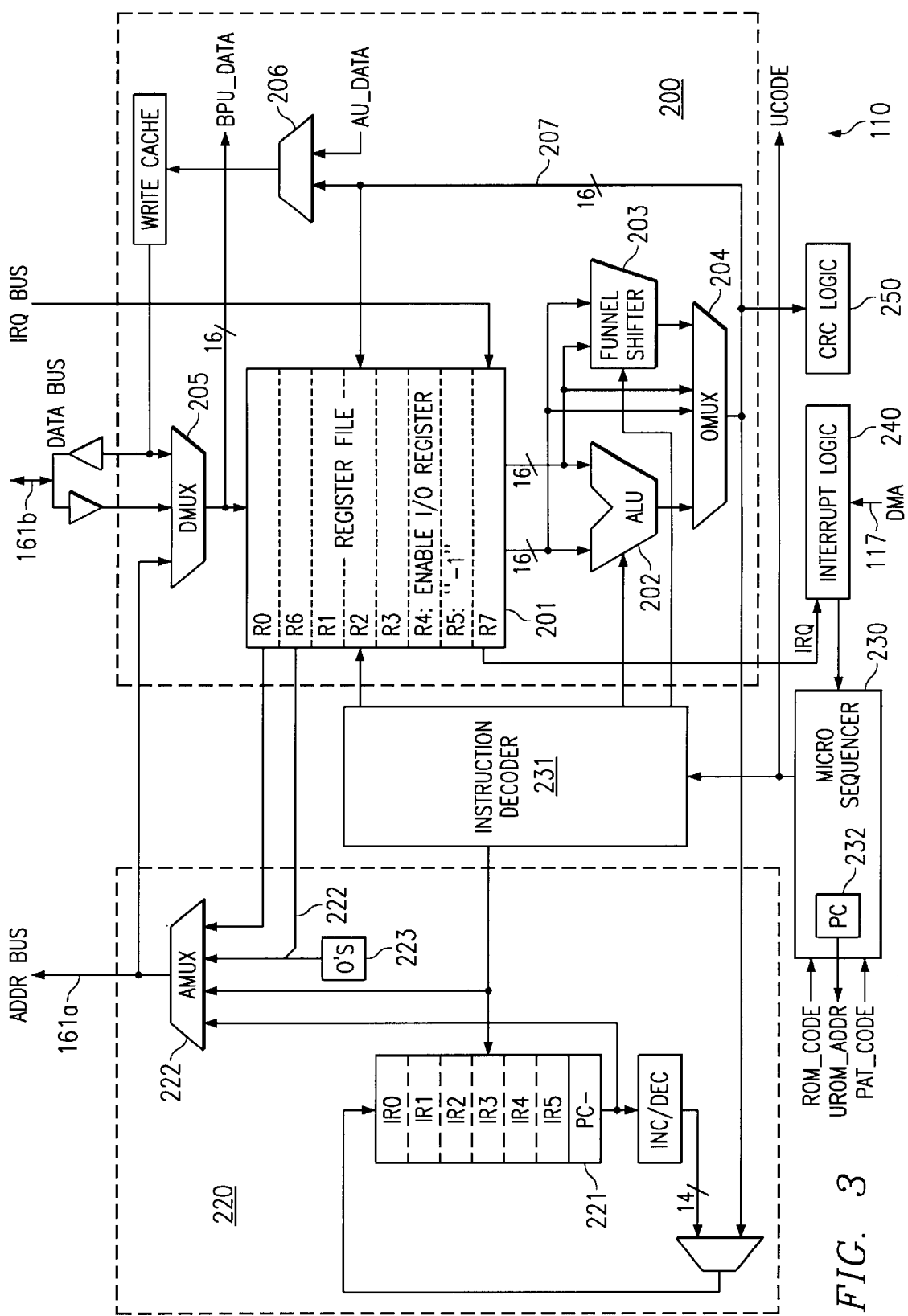
FIG. 3 is a block diagram of the Bit-stream Processing Unit of FIG. 2.

FIG. 3 is a block diagram of the Bit-stream Processing Unit of FIG. 2. BPU 110 is a programmable processor with hardware acceleration and instructions customized for audio decoding. It is a 16-bit reduced instruction set computer (RISC) processor with a register-to-register operational unit 200 and an address generation unit 220 operating in parallel. Operational unit 200 includes a register file 201 an arithmetic/logic unit 202 which operates in parallel with a funnel shifter 203 on any two registers from register file 201, and an output multiplexer 204 which provides the results of each cycle to input mux 205 which is in turn connected to register file 201 so that a result can be stored into one of the registers.

BPU 110 is capable of performing an ALU operation, a memory I/O, and a memory address update operation in one system clock cycle. Three addressing modes: direct, indirect, and registered are supported. Selective acceleration is provided for field extraction and buffer management to reduce control software overhead. Table 1 is a list of the instruction set.

TABLE 1

BPU Instruction Set

| Instruction Mnemonics | Functional Description |
|---|---|
| And | Logical and |
| Or | Logical or |
| cSat | Conditional saturation |
| Ash | Arithmetic shift |
| LSh | Logical shift |
| RoRC | Rotate right with carry |
| GBF | Get bit-field |
| Add | Add |
| AddC | Add with carry |
| cAdd | Conditional add |
| Xor | Logical exclusive or |
| Sub | Subtract |
| SubB | Subtract with borrow |
| SubR | Subtract reversed |
| Neg | 2's complement |
| cNeg | Conditional 2's complement |
| Bcc | Conditional branch |
| DBcc | Decrement & conditional branch |
| IOST | IO reg to memory move |
| IOLD | Memory to IO reg move |
| auOp | AU operation - loosely coupled |
| auEx | AU execution - tightly coupled |
| Sleep | Power down unit |

BPU 110 has two pipeline stages: Instruction Fetch/Predecode which is performed in Micro Sequencer 230, and Decode/Execution which is performed in conjunction with instruction decoder 231. The decoding is split and merged with the Instruction Fetch and Execution respectively. This arrangement reduces one pipeline stage and thus branching overhead. Also, the shallow pipe operation enables the processor to have a very small register file (four general purpose registers, a dedicated bit-stream address pointer, and a control/status register) since memory can be accessed with only a single cycle delay.

Figure 4:
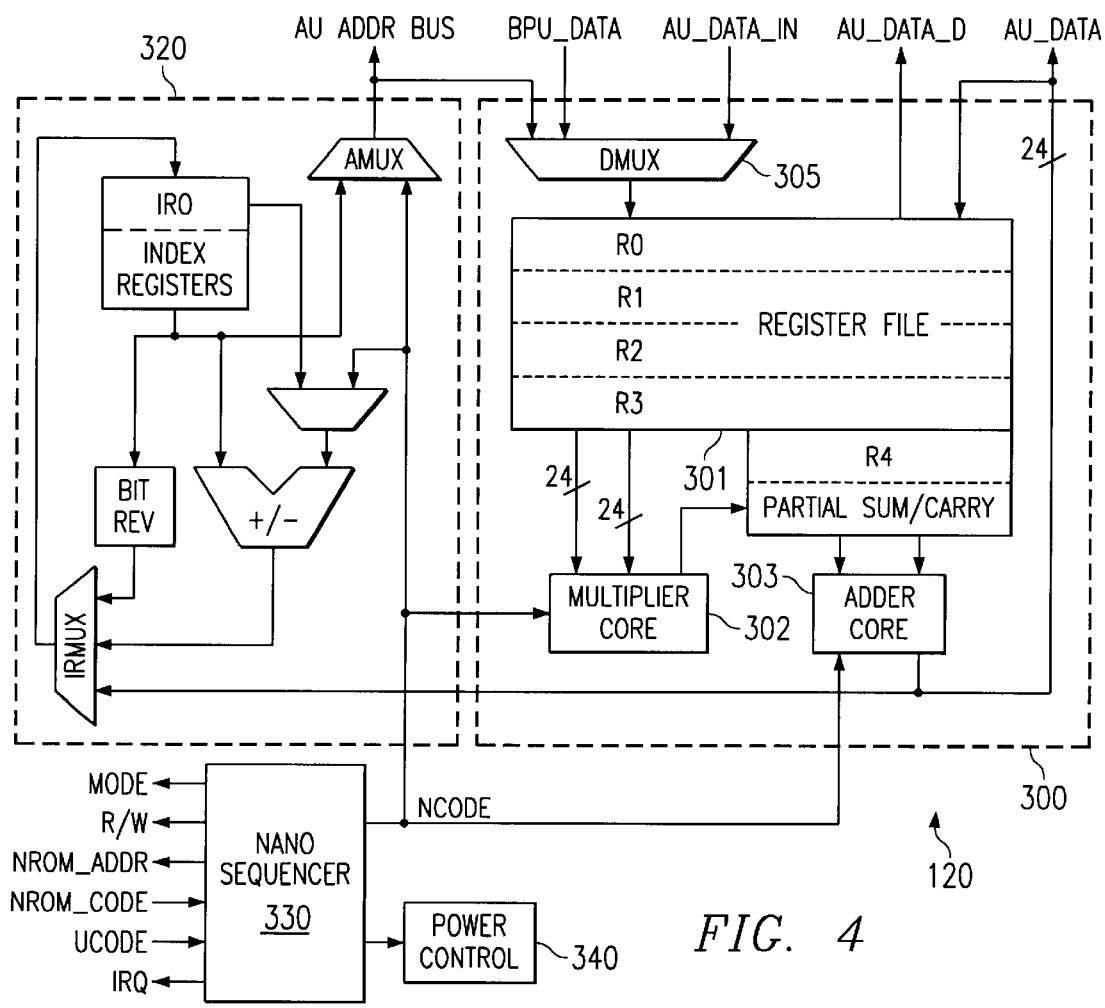
FIG. 4 is a block diagram of the Arithmetic Unit of FIG. 2.

FIG. 4 is a block diagram of the Arithmetic Unit of FIG. 2. Arithmetic unit 120 is a programmable fixed point math processor that performs the subband synthesis filtering. A complete description of subband synthesis filtering is provided in U.S. Pat. No. 5,644,310, entitled Integrated Audio Decoder System And Method Of Operation or U.S. Pat. No. 5,657,423 entitled Hardware Filter Circuit And Address Circuitry For MPEG Encoded Data, both assigned to the assignee of the present application), which is included herein by reference; in particular, FIGS. 7–9 and 11–31 and related descriptions.

The AU 120 module receives frequency domain coefficients from the BPU by means of shared AU memory 121. After the BPU has written a block of coefficients into AU memory 121, the BPU activates the AU through a coprocessor instruction, auOp. BPU 110 is then free to continue decoding the audio input data. Synchronization of the two processors is achieved through interrupts, using interrupt circuitry 240 (shown in FIG. 3).

AU 120 is a 24-bit RISC processor with a register-to-register operational unit 300 and an address generation unit 320 operating in parallel. Operational unit 300 includes a register file 301, a multiplier unit 302 which operates in conjunction with an adder 303 on any two registers from register file 301. The output of adder 303 is provided to input mux 305 which is in turn connected to register file 301 so that a result can be stored into one of the registers.

A bit-width of 24 bits in the data path in the arithmetic unit was chosen so that the resulting PCM audio will be of superior quality after processing. The width was determined by comparing the results of fixed point simulations to the results of a similar simulation using double-precision floating point arithmetic. In addition, double-precision multiplies are performed selectively in critical areas within the subband synthesis filtering process.

Figure 5:
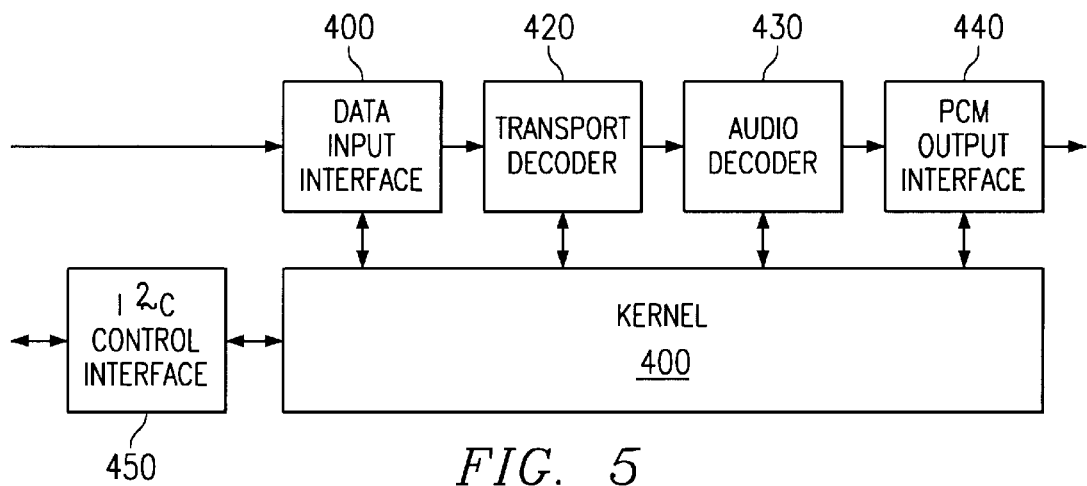
FIG. 5 is a block diagram illustrating the architecture of the software which operates on the device of FIG. 1.

FIG. 5 is a block diagram illustrating the architecture of the software which operates on data processing device 100. Each hardware component in device 100 has an associated software component, including the compressed bit-stream input, audio sample output, host command interface, and the audio algorithms themselves. These components are overseen by a kernel that provides real-time operation using interrupts and software multi-tasking.

The software architecture block diagram is illustrated in FIG. 5. Each of the blocks corresponds to one system software task. These tasks run concurrently and communicate via global memory 111. They are scheduled according to priority, data availability, and synchronized to hardware using interrupts. The concurrent data-driven model reduces RAM storage by allowing the size of a unit of data processed to be chosen independently for each task.

The software operates as follows. Data Input Interface 410 buffers input data and regulates flow between the external source and the internal decoding tasks. Transport Decoder 420 strips out packet information from the input data and emits a raw AC-3 or MPEG audio bit-stream, which is processed by Audio Decoder 430. PCM Output Interface 440 synchronizes the audio data output to a system-wide absolute time reference and, when necessary, attempts to conceal bit-stream errors. I$^2$C Control Interface 450 accepts configuration commands from an external host and reports device status. Finally, Kernel 400 responds to hardware interrupts and schedules task execution.

Figure 6:
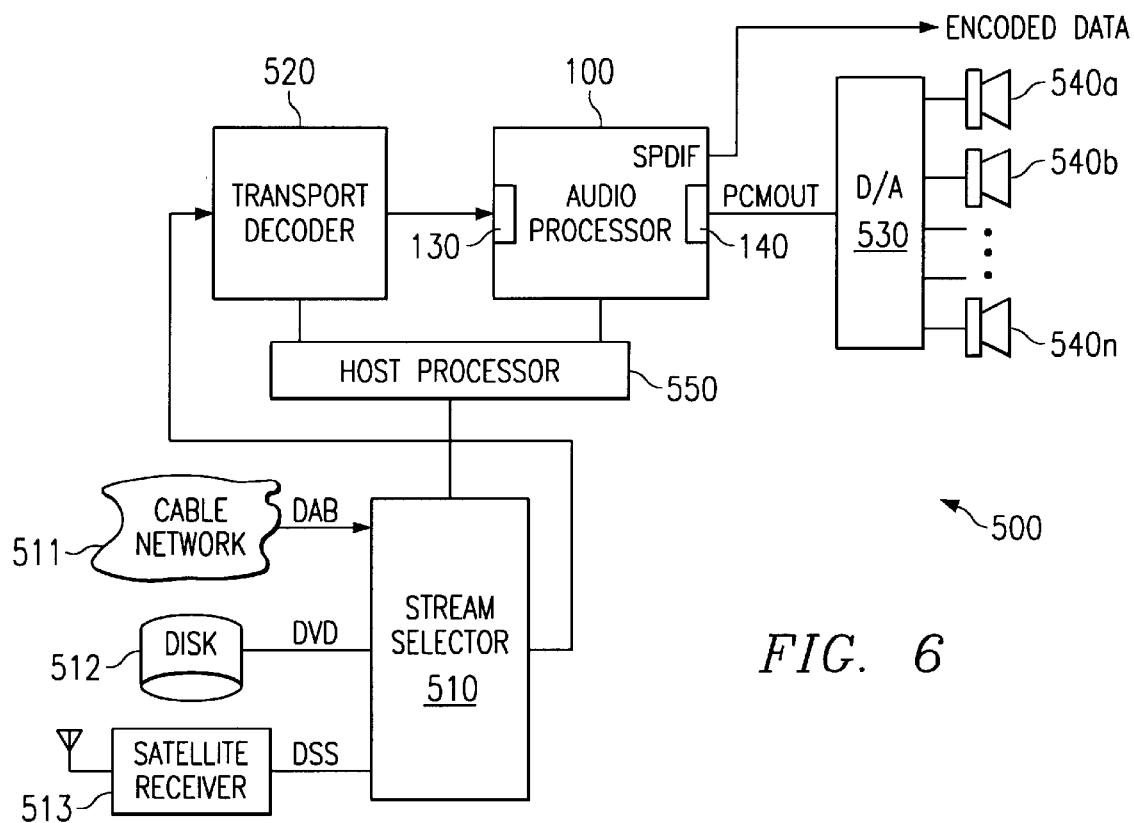
FIG. 6 is a block diagram illustrating an audio reproduction system which includes the data processing device of FIG. 1.

FIG. 6 is a block diagram illustrating an audio reproduction system 500 which includes the data processing device of FIG. 1. Stream selector 510 selects a transport data stream from one or more sources, such as a cable network system 511, digital video disk 512, or satellite receiver 513, for example. A selected stream of data is then sent to transport decoder 520 which separates a stream of audio data from the transport data stream according to the transport protocol, such as MPEG or AC-3, for that stream. Transport decoder typically recognizes a number of transport data stream formats, such as direct satellite system (DSS), digital video disk (DVD), or digital audio broadcasting (DAB), for example. The selected audio data stream is then sent to data processing device 100 via input interface 130. Device 100 unpacks, decodes, and filters the audio data stream, as discussed previously, to form a stream of PCM data which is passed via PCM output interface 140 to D/A device 530. D/A device 530 then forms at least one channel of analog data which is sent to a speaker subsystem 540a. Typically, A/D 530 forms two channels of analog data for stereo output into two speaker subsystems 540a and 540b. Processing device 100 is programmed to downmix an MPEG-2 or AC-3 system with more than two channels, such as 5.1 channels, to form only two channels of PCM data for output to stereo speaker subsystems 540a and 540b.

Alternatively, processing device 100 can be programmed to provide up to six channels of PCM data for a 5.1 channel sound reproduction system if the selected audio data stream conforms to MPEG-2 or AC-3. In such a 5.1 channel system, D/A 530 would form six analog channels for six speaker subsystems 540a–n. Each speaker subsystem 540 contains at least one speaker and may contain an amplification circuit (not shown) and an equalization circuit (not shown).

The SPDIF (Sony/Philips Digital Interface Format) output of device 100 conforms to a subset of the Audio Engineering Society's AES3 standard for serial transmission of digital audio data. The SPDIF format is a subset of the minimum implementation of AES3. This stream of data can be provided to another system (not shown) for further processing or re-transmission.

Figure 7:
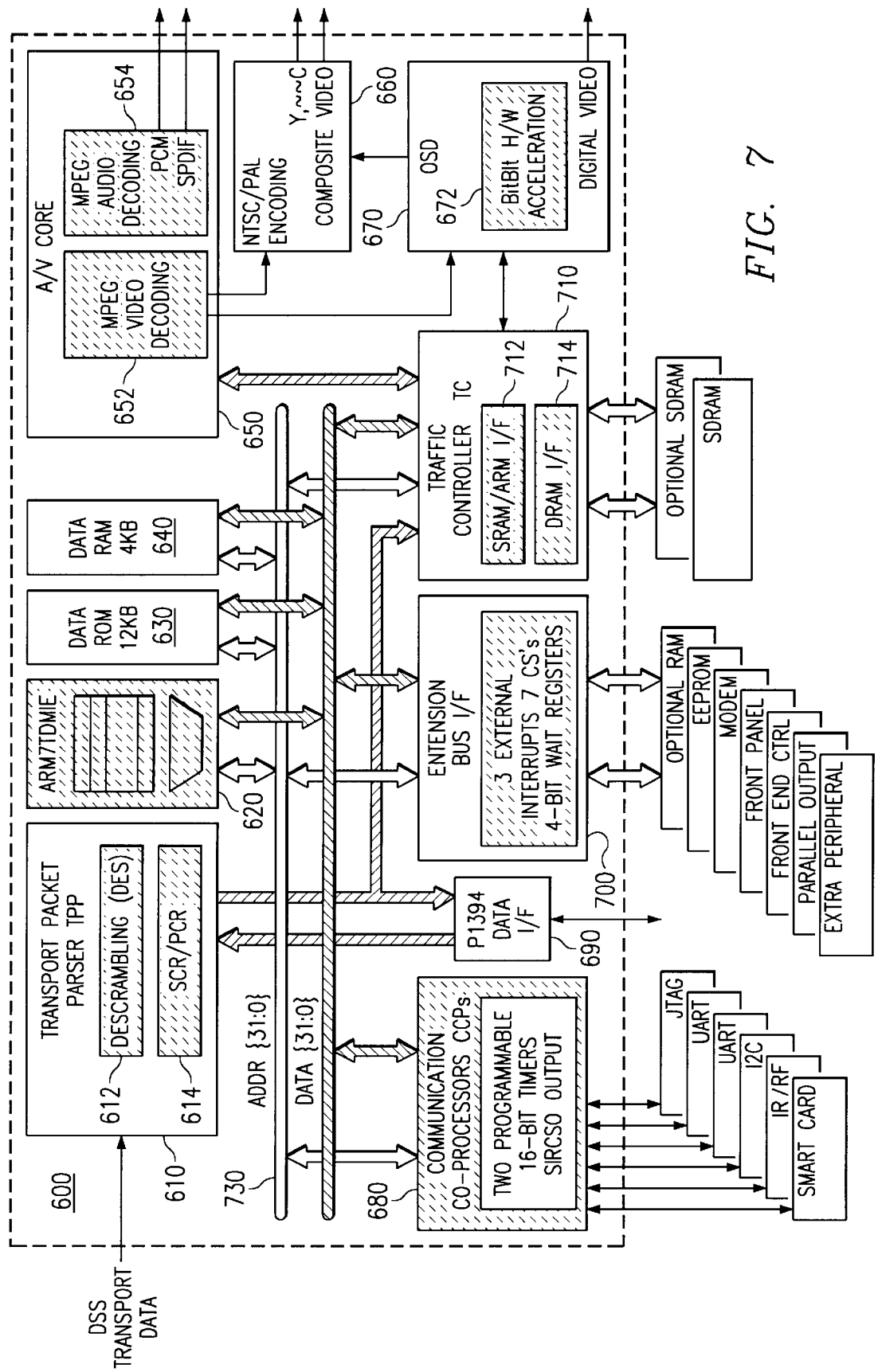
FIG. 7 is a block diagram of an integrated circuit which includes the data processing device of FIG. 1 in combination with other data processing devices, the integrated circuit being connected to various external devices.

Referring now to FIG. 7 there may be seen a functional block diagram of a circuit 300 that forms a portion of an audio-visual system which includes aspects of the present invention. More particularly, there may be seen the overall functional architecture of a circuit including on-chip interconnections that is preferably implemented on a single chip as depicted by the dashed line portion of FIG. 7. As depicted inside the dashed line portion of FIG. 7, this circuit consists of a transport packet parser (TPP) block 610 that includes a bit-stream decoder or descrambler 612 and clock recovery circuitry 614, an ARM CPU block 620, a data ROM block 630, a data RAM block 640, an audio/video (A/V) core block 650 that includes an MPEG-2 audio decoder 654 and an MPEG-2 video decoder 652, an NTSC/PAL video encoder block 660, an on screen display (OSD) controller block 670 to mix graphics and video that includes a bit-blt hardware (H/W) accelerator 672, a communication coprocessor (CCP) block 680 that includes connections for two UART serial data interfaces, infra red (IR) and radio frequency (RF) inputs, SIRCS input and output, an I²C port and a Smart Card interface, a P1394 interface (I/F) block 690 for connection to an external 1394 device, an extension bus interface (I/F) block 700 to connect peripherals such as additional RS 232 ports, display and control panels, external ROM, DRAM, or EEPROM memory, a modem and an extra peripheral, and a traffic controller (TC) block 710 that includes an SRAM/ARM interface (I/F) 712 and a DRAM I/F 714. There may also be seen an internal 32 bit address bus 320 that interconnects the blocks and seen an internal 32 bit data bus 730 that interconnects the blocks. External program and data memory expansion allows the circuit to support a wide range of audio/video systems, especially, as for example, but not limited to set-top boxes, from low end to high end.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. Thus, audio decoder 354 is the same as data processing device 100 with suitable modifications of interfaces 130, 140, 150 and 170. This results in a simpler and cost-reduced single chip implementation of the functionality currently available only by combining many different chips and/or by using special chipsets.

Figure 8A:
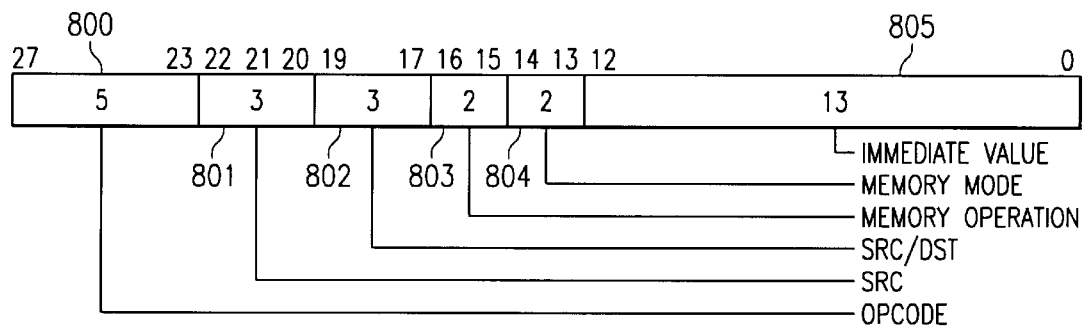
FIGS. 8A and 8B illustrate instruction formats for the BPU of FIG. 2.

A novel aspect of data processing device 100 will now be discussed in detail, with reference to FIGS. 8A and 8B which illustrate instruction formats for BPU 110. FIG. 8A is the format for arithmetic and logical instructions, such a ADD, AND, OR, etc. from Table 1. BPU instructions can specify one BPU operation and one memory operation. The possible combinations of BPU and memory are:

BPU operation into BPU register, and memory load into BPU register. The destination of the memory load may not be the same register as the BPU operation destination.

BPU operation into memory

BPU operation into index register

The sources of an BPU operation can be any BPU register. If the destination is a register, then it is one of the source registers. If the destination is memory or an index register, then the result is not loaded into the BPU register file.

The destination of a memory load is always one of two BPU registers, either R0 or R1. To load multiple BPU registers in sequence, an BPU operation can be pipelined to move the previously loaded value into its correct location, concurrently with the read. The purpose in restricting the registers that can be loaded into is to minimize the number of registers that have more than one source for a load.

Opcode field 800 defines the operation of the instruction. Source field 801 and source/destination field 802 specify the source and destination registers from register file 201, as shown in Table 2. Memory operation field 803 specifies a memory operation, as shown in Table 3. Memory mode field 804 specifies the addressing mode of a memory operation, as shown in Table 4. Addressing modes will be discussed in more detail later with respect to FIGS. 8C and 8D. Immediate field 805 contains a value that is used as data or an address, depending on the instruction.

TABLE 2

ALU SRC and SRC/DST Field Codes

| CODE | MNEMONIC | DESCRIPTION |
| --- | --- | --- |
| 000 | R0 | ALU register 0 |
| 001 | R1 | ALU register 1 |
| 010 | R2 | ALU register 2 |
| 011 | R3 | ALU register 3 |
| 100 | EN | I/O enable register |
| 101 | 1 | constant value of all ones |
| 110 | BIT | bit address pointer |
| 111 | ST | status register |

TABLE 3

MEM OP Field Codes

| CODE | MNEMONIC | DESCRIPTION |
| --- | --- | --- |
| 00 | NOP | no memo operation |
| 01 | ST | store ALU result to memory |
| 10 | LD0 | load immed/memory into R0 |
| 11 | LD1 | load immed/memory into R1 |

TABLE 4

MEM Mode Field Codes

| CODE | MNEMONIC | DESCRIPTION |
|------|----------|-------------|
| 00 | val() | immediate value |
| 01 | mem() | direct memory address |
| 10 | atbl() | register IRx or R0 or R6 |
| 11 | tbl() | indirect via IRx or R0 or R6 |

Figure 8B:
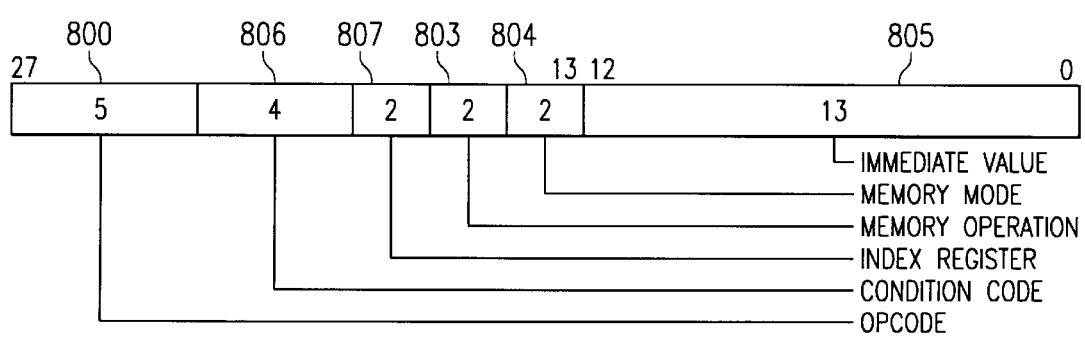

FIG. 8B illustrates the format for a branch instruction. Conditional branch (Bcc) loads the memory input into the program counter if the specified condition is true. All addressing modes are available, but the MEM OP field must be set to NOP to prevent writing to the ALU register file. The instruction at the next microcode address after the branch instruction (the delay slot) is always executed whether the branch is taken or not, due to instruction decode pipelining. If this instruction cannot be otherwise used it should be filled with a NOP.

Interrupts will not be serviced until after the instruction in the delay slot has been executed. A branch instruction may not appear in the delay slot of another branch instruction.

All addressing modes are allowable for branches. In particular the table lookup, referred to as "indexed immediate," addressing mode is valuable for computed branches via a jump table, and the direct mode for interrupt and subroutine return.

The decrement and branch instruction (DBcc) is a conditional branch where the conditional is whether a given index register is non-zero or not. The register is always decremented. This is used to implement loop counters.

The Dbcc instruction has the same opcode and format as an ordinary conditional branch, being just one of the possible conditions. However, since an index register must be specified in addition to the branch destination, a separate two bit field must be used for the index register number. Only index registers 0–3 can be used in the decrement and branch instruction.

Since index register file 221 is single read and write, this means that the destination address of the decrement and branch instruction cannot involve an index register computation. This is enforced by the microcode assembler. All other addressing mode are allowed as for branch instructions.

Referring still to FIG. 8B, conditional code field 806 specifies a condition, as shown in Table 5. Index register field 807 specifies index register 0–3 for Dbcc instructions.

TABLE 5

CC Field Codes

| CODE | MNEMONIC | DESCRIPTION |
|------|----------|-------------|
| 0000 | EQ | prev result == 0 |
| 0001 | NE | prev result != 0 |
| 0010 | LT | prev result < 0 (signed) |
| 0011 | GE | prev result >= 0 (signed) |
| 0100 | GT | prev result > 0 (signed) |
| 0101 | LE | prev result <= 0 (signed) |
| 0110 | HS,CS | prev result >= 0 (unsigned) |
| 0111 | LO,CC | prev result < 0 (unsigned) |
| 1000 | HI | prev result > 0 (unsigned) |
| 1001 | LS | prev result <= 0 (unsigned) |
| 1100 |  | unconditional |
| 1110 | IREQ x | IRx == 0 |
| 1111 | IRNE x | IRx != 0 |

Figure 8C:
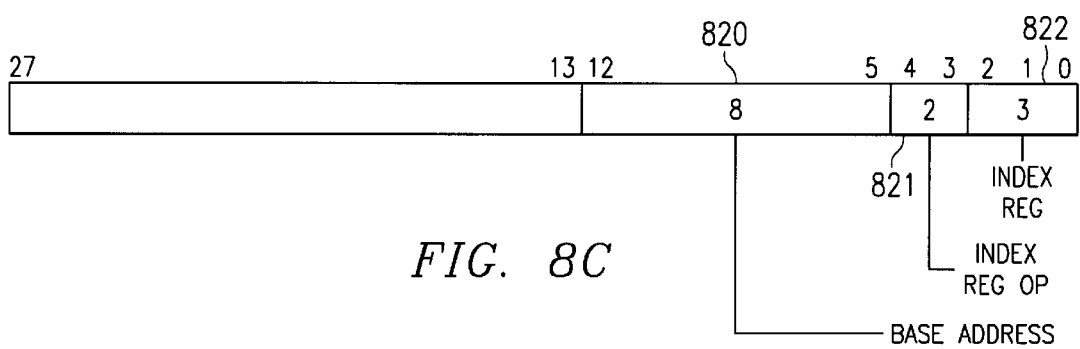
FIGS. 8C and 8D illustrate optional addressing fields for the instructions of FIGS. 8A–8B, according to an aspect of the present invention.
Figure 8D:
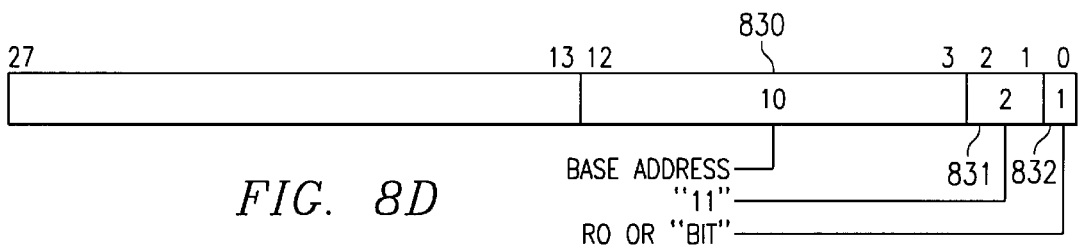

FIGS. 8C and 8D illustrate an optional addressing field which can be used in any of the previously discussed instructions. As discussed previously, addressing mode is specified by the MEM MODE field 804. There are four possible modes:

immediate: load a signed 13 bit value from the instruction word direct: load a memory location specified by a 13 bit field in the instruction word.

register: load a value from index register IR0-3 or BPU register R0 or R6.

indirect: load a value from memory, addressed via index register IR0-5 or BPU register R0 or R6.

According to an aspect of the present invention, indirect mode can optionally replace some high order bits of the memory address with immediate bits from the instruction. This optional mode is referred to as "indexed immediate addressing mode." This allows the base address for a table lookup to be specified in the instruction, with the index coming from an index register or BPU register. There are at least three advantageous uses for this:

very fast table lookup operations: Table lookups are used for multi-way branch instructions, ungrouping mantissas and exponents, log adds, interrupt vectoring.

circular buffers: Since the upper address bits of the index are ignored, all tables are effectively circular. This can be exploited for buffers.

increase effective number of index registers: One index register can be used in a loop to address multiple tables. Index registers are also used as loop counters, so extras help.

Index registers IR0-5 can optionally be modified concurrently with an indirect addressing operation. The possible modifications are post-increment or decrement by one, and post-load from the operational unit 200 result. The increment and decrement modifications allow stepping through arrays. The load modification is used to load an index register from the BPU register file.

When used in an addressing mode, BPU register R6 (alternate name "BIT") simulates bit addressing. If R6<15:0> is assumed to be a bit address, then bits R6<15:4> form the least significant 12 bits of the 14 bit word address, the most significant bits being set to zero. This value becomes the input to the address computation which is otherwise the same as for R0. Bits R6<3:0> are used by the get bit field instruction to complete the bit addressing function.

Register addressing mode has the same instruction format as indirect mode. The meaning of the fields is identical, however the result value is the computed memory address itself rather than the contents of memory at that address. This can be used to load the value of an index register into the BPU register file, or to compute the actual address referred to by an addressing operation.

Referring to FIG. 8C, base address field 820 specifies a base value that is combined with a selected index register to form a complete address. This will be discussed in more detail with reference to FIG. 9. Index register operation field 821 specifies what operation is performed on a selected index register, as shown in Table 6. Index register source/destination field 822 specifies the selected index register, as shown in Table 7.

TABLE 6

Index Register Operation Field Codes

| CODE | MNEMONIC | DESCRIPTION |
|------|----------|-------------|
| 00 | none | no modification |
| 01 | ++ | post-increment by one |
| 10 | -- | post-decrement by one |
| 11 | = | post-load with ALU result |

TABLE 7

Index Register Source/Destination Field Codes

| CODE | MNEMONIC | DESCRIPTION |
|------|----------|-------------|
| 000 | IR0 | index register 0 |
| 001 | IR1 | index register 1 |
| 010 | 1R2 | index register 2 |
| 011 | 1R3 | index register 3 |
| 100 | 1R4 | index register 4 |
| 101 | 1R5 | index register 5 |
| 110 | R0 | BPU register 0 |
| 111 | BIT | BPU register 6 (drop 4 LSBs) |

FIG. 8D illustrates a special case of the addressing mode illustrated in FIG. 8C in which the two most significant bits of IR src/dest field 822 are "11." In this case, no index register operation is done because a non-index register is selected, so index register operation field 821 is deleted. Thus, in FIG. 8D, base address field 830 is nine bits, as compared to seven bits for base address field 820 of FIG. 8C. Source/destination field 832 specifies registers, as shown in Table 8.

TABLE 8

Source/Destination Field 832 Codes

| CODE | MNEMONIC | DESCRIPTION |
|------|----------|-------------|
| 0 | R0 | BPU register 0 |
| 1 | BIT | BPU register 6 (drop 4 LSBs) |

Figures 9, 10:
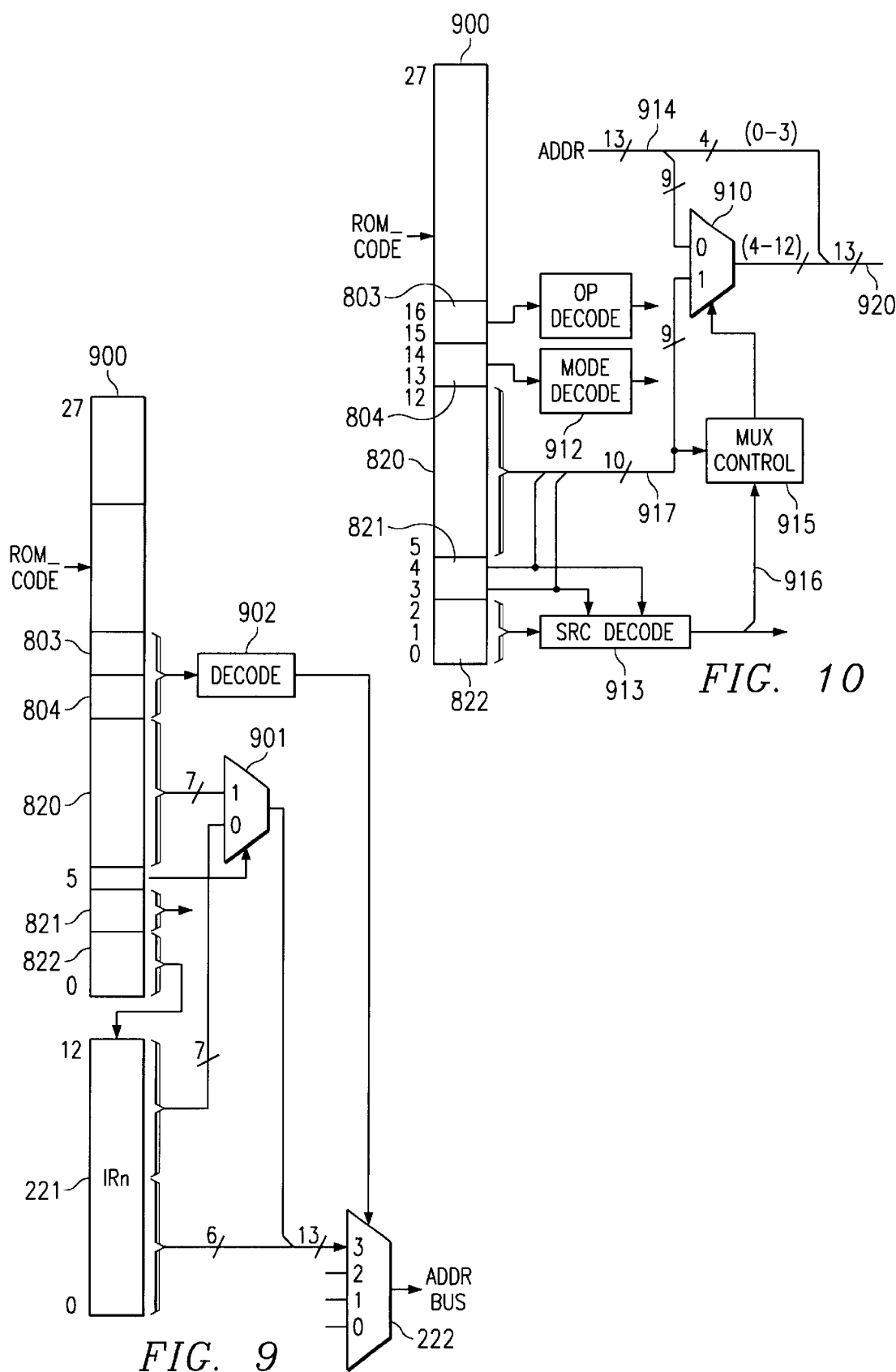
FIG. 9 is a block diagram illustrating formation of an indexed immediate address using the address fields of FIGS. 8C and 8D.
FIG. 10 is a block diagram illustrating formation of an indexed immediate address using the address fields of FIGS. 8C and 8D, according to another aspect of the present invention.

FIG. 9 is a block diagram illustrating formation of an address using the address fields of FIGS. 8C. Instruction register 900 receives an instruction from ROM 112 via the rom_code bus. Decode circuitry 902 decodes memory mode field 804 and memory operation field 803 to determine if a memory cycle is to be performed and the addressing mode to be used. If an indirect addressing mode is specified, then decode circuitry causes address multiplexor 222 to select input 3, which is connected to six lsb bits of index register file 221 and seven bits of multiplexor 901. Multiplexor 901 has one input connected to the seven msb bits of index register file 221. Source field 822 is connected to index register file 221 an identifies the selected index register IR(n). Another input of multiplexor 901 is connected to base address field 820 of the instruction register. When bit 5 of the instruction is "0," the msbs of the index register file is provided to mux 222. When bit 5 is "1," the base address field is provided to mux 222 so that an indexed immediate address is formed, according to the present invention.

FIG. 10 is a block diagram illustrating formation of an address using the address fields of FIGS. 8C or 8D, according to another aspect of the present invention. Instruction register 900 again receives an instruction from ROM 112. Decode circuitry 912 decodes memory mode field 804 and decode circuitry 911 decodes memory operation field 803 to determine if a memory cycle is to be performed and the addressing mode to be used. Decode circuitry 913 decodes fields 821 and 822 and selects a source register according to Table 7 to provide an address on bus 914 from index register file 221 or register file 201. Decode circuitry 913 also detects the special case of when the two msb bits of field 822 are "11" as discussed earlier and indicates this to mux 915 via signal 916. Mux 910 selects between address bits provided on bus 914 and immediate bits provided on bus 917.

Still referring to FIG. 10, an aspect of the present invention is that mux control circuit 915 examines the immediate bit field on bus 917, which includes bits 3 to 12 of the instruction register, to determine how many bits are selected from each source by mux 910. Tables 9 and 10 describe how mux control circuit 915 and mux 910 operate. Table 9 is used when bits 1 and 2 of an instruction are not both "1" which corresponds to the format of FIG. 8C, while Table 10 is used when bits 1 and 2 of an instruction are both "1" which corresponds to FIG. 8D. For example, in Table 9, if bits 5–9 of the instruction are all "0," the full register address on bus 914 is selected by mux 910 to form an address on address bus 920. However, if bit 5 is a "1," then mux 910 selects seven bits on bus 917 from the instruction register, bits 6–12, and two bits from the address bus 914, bits 4–5, to form a partial address on the output of mux 910. These bits are concatenated with four lsb bits, bits 0–3, on address bus 914 to form a complete thirteen bit address on address bus 920. This combination has the effect of forming a 64 word table beginning at a base address specified by bits 6–12 in an instruction.

Still referring to FIG. 10, mux control circuit 915 examines the immediate field until the first "1" is found in order to select the width of the base address value in the immediate field. In Table 9, if the first "1" is in bit 6, then a table size of 128 is selected. Likewise in Table 10, if the first "1" is in bit 6, then a table size of 128 words is selected, but if the first "1" is in bit 3, then a table size of 16 words is selected. It should be noted that this scheme works equally well if the bits are inverted and a first "0" is determined. Thus, mux control circuitry 915 parses the immediate field of the instruction to determine the bit position of the first toggled bit.

The advantages of a variable size table selection are not limited to this embodiment. Devices with different address widths can be similarly enabled by modifying the width of the immediate field or by padding the output of mux 910 with a preselected fixed or variable value in order to form a final address with an appropriate number of bits.

TABLE 9

Short Table Field Codes

| INSTRUCTION REG BITS 1 1 2 0 8765 | DESCRIPTION |
|-----------------------------------|-------------|
| XXX00000 | full address |
| XXXXXXX1 | table size 64 |
| XXXXXX10 | table size 128 |
| XXXXX100 | table size 256 |
| XXXX1000 | table size 512 |
| XXX10000 | table size 1024 |

TABLE 10

Long Table Field Codes

| INSTRUCTION REG BITS 1 1 2 0 876543 | DESCRIPTION |
|---|---|
| XXX0000000 | full address |
| XXXXXXXXX1 | table size 16 |
| XXXXXXXX10 | table size 32 |
| XXXXXXX100 | table size 64 |
| XXXXXX1000 | table size 128 |
| XXXXX10000 | table size 256 |
| XXXX100000 | table size 512 |
| XXX1000000 | table size 1024 |

Figure 11:
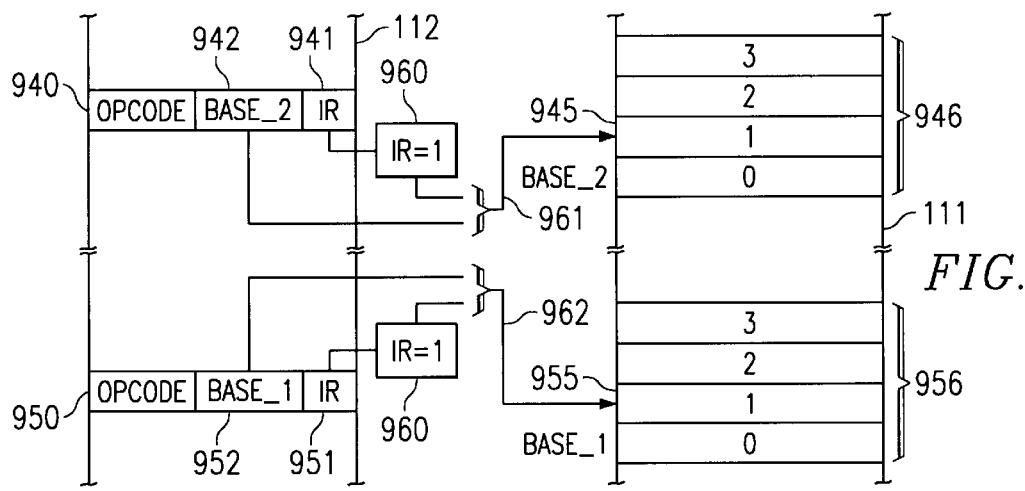
FIG. 11 illustrates a method for accessing multiple data structures using a common index value, according to an aspect of the present invention.

FIG. 11 illustrates a method for accessing multiple data structures using a common index value, according to an aspect of the present invention. Memory 112 holds instructions for execution by BPU 110 (FIG. 2). An instruction 940 has index register field 941 and a base address field 942 which are interpreted as described previously, with reference to FIG. 10. Index register field 941 selects a specified register 960 which contains a value of "1," for example. Base address field 942 contains a base value of "base_2" which points to an address in memory 111 and is the beginning of a first data structure 946. The base address value is combined with the index register value to form an address 961 which points to a data word 945. Likewise, an instruction 950 has index register field 951 and a base address field 952. Index register field 951 selects the same register 960 which contains a value of "1." Base address field 952 contains a base value of "base_1" which points to an address in memory 111 which is the beginning of a second data structure 956. The base address value is combined with the index register value to form an address 962 which points to a data word 955. Advantageously, both data structures are accessed using the same selected register 960 by using the indexed-immediate addressing mode. For various types of applications, instruction 940 may modify the contents of register 960 by incrementing, decrementing, etc., so that instruction 950 accesses a data word in structure 956 that is at a different relative location.

In the table addressing mode, the more significant bits (4–12 for index register mode—FIG. 8C, and 6–12 for non-index register mode—FIG. 8D) are replaced by data in the instruction word. For example, when a non-index register is being used to form a memory address in table look-up mode, the nine more significant bits of the reg are replaced by data from the instruction word, while the four lsbs of the register are an index to a "table" that starts at the address designated by the nine bit data from the instruction word immediate field.

When applied to data look-up, like sine/cosine tables, the starting point, or base, of the table and its size is passed on to the assembler during assembling time. The assembler then checks for alignments (i.e. tables with 16 entries need to be aligned to 16 boundaries, that is, the least significant four bits of the base address need to be 0). It then inserts the appropriate ms bits of the table base address into the instruction word (nine in case of 16 entry table, the total address is 13 bits).

Figure 12:
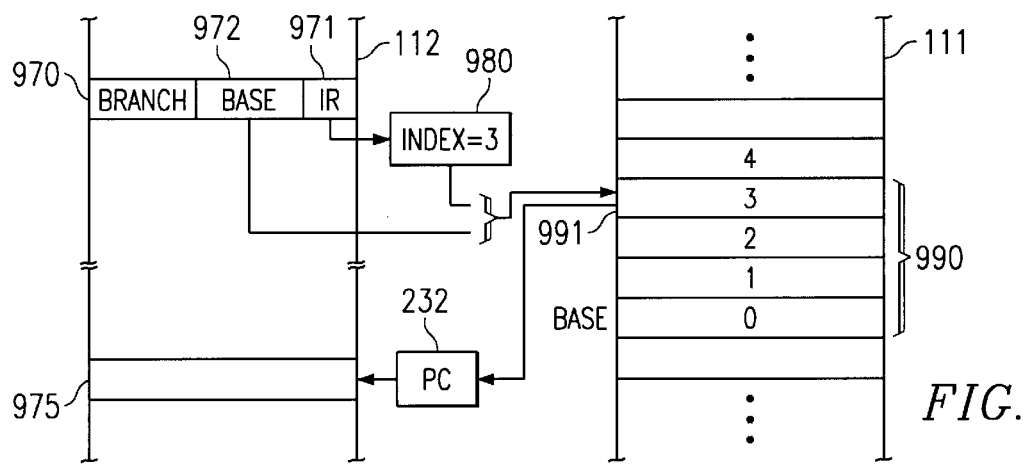
FIG. 12 illustrates a method for performing multi-way branching according to an aspect of the present invention.

FIG. 12 illustrates a method for performing multi-way branching according to an aspect of the present invention. Instruction memory 112 holds instructions for execution by BPU 110 (FIG. 2). A Branch instruction 970 has index register field 971 and a base address field 972 which are interpreted as described previously, with reference to FIG. 10. Index register field 971 selects a specified register 980 which contains a value of "3" or example. Base address field 972 contains a base value of "base" which points to an address in data memory 111. A branch table 990 is located at this address, and contains data words 0–3, for example. The base address value is combined with the index register value to form an address 991 which points to a data word 3 in the branch table 990. Data word 3 contains the value of an address of instruction 975 in program memory 112. Data word 3 is loaded into program counter 231 and program execution branches to instruction 975. Advantageously, program flow is determined by the contents of a selected register 980 and branch table 990 by the use the indexed-immediate addressing mode.

When indexed-immediate addressing mode is applied to multi-way branch, an additional step is to build the branch table by copying branch-target addresses into the table (as compared with data tables in which the contents are known), after that it is assembled the same way as data look-up. One simple example to illustrate multi-way branch: MPEG standard has 3 "layers". Two bits in the header indicates the layer. The decoding is different for each layer. One way to do this would be to put the 3 starting addresses of the decoding section for each layer into a 4 entry table. The value of the two layers would then read into R0, for example, and then a branch table(MPEG_layer, R0) is executed, where MPEG layer is the most significant bits indicating the starting address of the table and the ls bits of R0 are used as an index.

Figure 13:
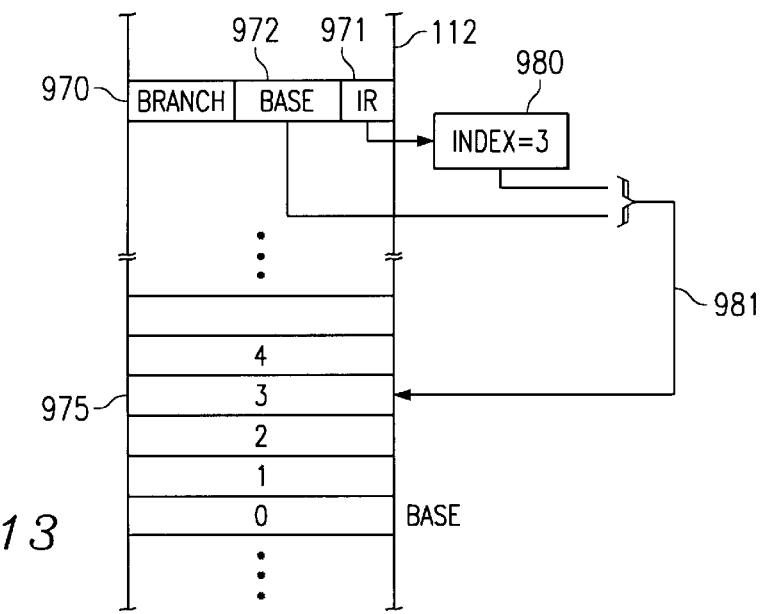
FIG. 13 illustrates an alternative method for performing multi-way branching according to an aspect of the present invention.

FIG. 13 illustrates an alternative method for performing multi-way branching according to an aspect of the present invention. Memory 112 holds instructions for execution by BPU 110 (FIG. 2). A Branch instruction 970 has index register field 971 and a base address field 972 which are interpreted as described previously, with reference to FIG. 10. Index register field 971 selects a specified register 980 which contains a value of "3", for example. Base address field 972 contains a base value of "base" which points to an address in memory 11. The base address value is combined with the index register value to form an address 981 which points to an instruction 975 and program execution branches to this instruction. Advantageously, program flow is determined by the contents of a selected register 980 by the use the indexed-immediate addressing mode.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Other types of processing devices having a Central processing unit (CPU) connected to an instruction register can advantageously incorporate aspects of the present invention.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual devices which may be sold as bare die or packaged. After packaging, finished parts are biased into an operational state and tested for operational functionality.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device, comprising:
  a central processing unit (CPU) with an instruction register operable to hold an instruction, wherein the CPU is operable to process a data word in response to the instruction;
  an index register connected to the CPU and operable to provide a first address in response to the instruction; and
  address circuitry connected to the CPU and operable to form a memory address of the data word by selecting a first portion of the first address from the index register and combining the first portion of the first address with a first portion of an immediate field selected from the instruction, such that the first portion of the immediate field is a most significant address portion with the first portion of the first address as a least significant address portion, wherein the first portion of the immediate field has a first width and the first portion of the first address has a second width.

2. The data processing device of claim 1, wherein the address circuitry is operable to form the memory address by concatenating the first portion of the immediate field as a most significant address portion with the first portion of the first address as a least significant address portion.

3. The data processing device of claim 1, further comprising decoding circuitry connected to the address circuitry and operable to select a first value for the first width from a first range of values responsive to the instruction.

4. The data processing device of claim 3, wherein the decoder circuitry is further operable to select a second value for the second width from a second range of values responsive to the instruction.

5. The data processing device of claim 4, wherein the decoder circuitry is further operable to parse the immediate field to determine a bit position for a first toggled bit.

6. A method for forming an address for accessing a data word in a data processing device while executing an instruction, the method comprising:
  placing an immediate value in an immediate field of the instruction prior to executing the instruction, wherein the immediate value includes a base value;
  accessing an index register within the data processing device specified by the instruction to obtain an index value; and
  combining the index value with the base value to form the address for accessing the data word so that the base value forms a most significant portion of the address and the index value forms a least significant portion of the address.

7. The method of claim 6, wherein the step of combining further comprises concatenating the index value with the base value so that the base value forms a most significant portion of the address and the index value forms a least significant portion of the address, whereby a plurality of tables having different base addresses can be accessed with a common index value.

8. The method of claim 7, wherein the step of combining further comprises decoding the immediate value to determine a width of the index value.

9. The method of claim 8, wherein the step of decoding further comprises parsing the immediate value to determine a bit position for a first toggled bit and selecting the width of the index value in response to the bit position.

10. A method for accessing multiple data structures in a data processing system using a common index value, the method comprising:
  fetching instructions for execution from an instruction memory of the data processing system;
  initializing an index register within the data processing system with the common index value;
  executing a first instruction having an indexed immediate addressing mode, wherein the first instruction has an immediate value comprising a first base value, such that a first data structure in a first portion of memory of the data processing system is accessed by the first instruction;
  executing a second instruction having an indexed immediate addressing mode, wherein the second instruction has an immediate value comprising a second base value, such that a second data structure in a second portion of memory of the data processing system is accessed by the second instruction;
  wherein the step of executing the first instruction further comprises:
    accessing the index register within the data processing system specified by the first instruction to obtain the common index value; and
    combining the common index value with the first base value to form an address for accessing the first data structure so that the first base value forms a most significant portion of the address and the common index value forms a least significant portion of the address; and
  wherein the step of executing the second instruction further comprises:
    accessing the index register within the data processing system specified by the second instruction to obtain the common index value; and
    combining the common index value with the second base value to form an address for accessing the second data structure so that the second base value forms a most significant portion of the address and the common index value forms a least significant portion of the address, whereby the same common index value is used to access multiple data structures in the data processing system.

11. A method for performing multi-way branching in a data processing system, the method comprising:
  fetching instructions in an ordered sequence for execution from an instruction memory of the data processing system;
  reading a data value indicative of a target address from a first portion of memory of the data processing system;
  initializing an index register within the data processing system with the data value;
  executing a branch instruction having an indexed immediate addressing mode, wherein the branch instruction has an immediate value comprising a first base value, such that the ordered sequence for execution includes an instruction located in the instruction memory at an address specified by a combination of the first base value and the data value;

wherein the step of executing the branch instruction further comprises:

accessing the index register within the data processing system specified by the branch instruction to obtain the data value; and combining the data value with the first base value to form an address for branching to such that the first base value forms a most significant portion of the address and the data value forms a least significant portion of the address.

12. A method for performing multi-way branching in a data processing system, the method comprising:

forming a branch table in a first portion of memory of the data processing system;

fetching instructions in an ordered sequence for execution from an instruction memory of the data processing system;

reading a data value indicative of a target address from a second portion of memory of the data processing system;

initializing an index register within the data processing system with the data value;

executing a branch instruction having an indexed immediate addressing mode, wherein the branch instruction has an immediate value comprising a first base value which points to the branch table, such that the ordered sequence for execution includes an instruction located in the instruction memory at an address specified by an entry in the branch table indicated by the data value;

wherein the step of executing the branch instruction further comprises:

accessing the index register within the data processing system specified by the branch instruction to obtain the data value;

combining the data value with the first base value to form an address of an entry in the branch table such that the first base value forms a most significant portion of the address and the data value forms a least significant portion of the address; and branching to an instruction at an address specified by the entry in the branch table.

\* \* \* \* \*